United States Patent [19]
Kinoshita et al.

[11] Patent Number: 5,948,496
[45] Date of Patent: Sep. 7, 1999

[54] OPTICAL RECORDING MEDIUM

[75] Inventors: Mikio Kinoshita, Yokohama; Makoto Harigaya, Hiratsuka, both of Japan

[73] Assignee: Ricoh Company, Ltd., Tokyo, Japan

[21] Appl. No.: 08/824,793

[22] Filed: Mar. 26, 1997

[30] Foreign Application Priority Data

Sep. 6, 1996 [JP] Japan .................................. 8-257858
Dec. 20, 1996 [JP] Japan .................................. 8-341931

[51] Int. Cl.$^6$ ...................................................... B32B 3/00
[52] U.S. Cl. .................. 428/64.1; 428/64.2; 428/64.4; 428/64.5; 428/64.6; 428/457; 428/913; 430/270.13; 430/495.1; 430/945; 369/283; 369/288
[58] Field of Search .................. 428/64.1, 64.2, 428/64.4, 64.5, 64.6, 457, 913; 430/270.13, 495.1, 945; 369/283, 288

[56] References Cited

U.S. PATENT DOCUMENTS

| | | |
|---|---|---|
| 5,011,723 | 4/1991 | Harigaya et al. . |
| 5,024,927 | 6/1991 | Yamada et al. . |
| 5,080,947 | 1/1992 | Yamada et al. . |
| 5,100,700 | 3/1992 | Ide et al. . |
| 5,156,693 | 10/1992 | Ide et al. . |
| 5,637,371 | 6/1997 | Tominaga et al. ..................... 428/64.1 |
| 5,681,632 | 10/1997 | Kitaura et al. ........................ 428/64.1 |
| 5,785,828 | 7/1998 | Yamada et al. ..................... 204/298.13 |

FOREIGN PATENT DOCUMENTS

| | | |
|---|---|---|
| 57-208648 | 12/1982 | Japan . |
| 2-37466 | 2/1990 | Japan . |
| 2-171325 | 7/1990 | Japan . |
| 4-10979 | 1/1992 | Japan . |
| 4-10980 | 1/1992 | Japan . |
| 4-11336 | 1/1992 | Japan . |
| 4-52188 | 2/1992 | Japan . |
| 4-52189 | 2/1992 | Japan . |
| 4-141485 | 5/1992 | Japan . |
| 4-232779 | 8/1992 | Japan . |

*Primary Examiner*—Elizabeth Evans
*Attorney, Agent, or Firm*—Dickstein Shapiro Morin & Oshinsky, LLP

[57] ABSTRACT

An optical recording medium includes a substrate, a first protection layer formed on the substrate, a recording layer formed on the first protection layer, a second protection layer formed on the recording layer, and a reflection heat radiating layer formed on the second protection layer. The recording layer is of a phase-change type in which the recording layer is changed from an amorphous state to a crystal state by a temperature raising and cooling process by projecting a laser beam onto the recording layer. The recording layer has an interface portion interfaced with one of the first and second protection layers. The interface portion has a thermal conductivity lower than that of a remaining portion of the recording layer.

12 Claims, 8 Drawing Sheets

OPTICAL RECORDING MEDIUM

BACKGROUND OF THE INVENTION

1. Field of the Invention

The present invention generally relates to optical recording media, and more particularly to a phase-change type optical recording medium such as a phase-change type optical disk, in which an optical change is caused in a substance of a recording layer by projecting a light beam thereon to thereby record information on the recording layer and reproduce information therefrom and to erase and rewrite information.

2. Description of the Related Art

A phase-change type optical recording medium is well known which utilizes a transition between a crystal phase and an amorphous phase or a transition between a crystal phase and another crystal phase. Such a phase-change type optical recording medium is an information recordable, reproducible and rewritable medium. More particularly, information can be overwritten onto the phase-change type optical recording medium by a single light beam, and the medium can be driven by a simple optical drive system. Since the phase-change type optical recording medium has the above features, it is applied as a recording medium in the computer-related fields and video/acoustic fields. The following are known as the recording substance: GeTe, GeTeSe, GeTeS, GeSeS, GeSeSb, GeAsSe, InTe, SeTe, SeAs, Ge—Te—(Sn, Au, Pd), GeTeSeSb, GeTeSb, Ag—In—Sb—Te.

Japanese Unexamined Patent Publication No. 57-208648 discloses a recording layer buried in a mother substance of $SiO_2$ or the like in order to suppress a non-reversible change of the recording substance. Particularly, the recording substance of Ag—In—Sb—Te has a feature in which it is highly sensitive and the contour of an amorphous portion is definite, and is thus applied to mark-edge recording (see Japanese Unexamined Patent Publication Nos. 2-37466, 2-171325, 2-415581 and 4-141485).

A multilayer structure including the recording layer made of the above recording substance is known. Such a multilayer structure includes, in addition to the recording layer, a reflection layer, a first protection layer and a second protection layer. Nowadays, it is required for the multilayer recording medium that the repetitive recording performance be improved and the recording performance be compatible with other performances such as the degree of modulation and given reflection rate.

Regarding the above requirement, the following documents show that a flow of the recording layer is suppressed and the repetitive recording performance can be improved by adding nitrogen (N) or the like to the recording layer: Japanese Unexamined Patent Publication Nos. 4-11336, 4-10980, 4-10979, 4-52188 and 4-52189.

An optical recording medium specifically applied to a less-expensive optical recording system having a relatively low recording linear velocity or used as an optical recording medium (CD-RW: Compact Disk ReWritable) that is reproduction-compatible with the CD (Compact Disk) has a limited number of times that information can be repeatedly recorded, normally, hundreds to millions of times. This is because the recording layer is flowed or a film of the multilayer structure is flaked off due to a thermal shock caused at the time of projecting the laser beam thereon or because a metal used for the reflection layer is degraded. Such a limited number of times that information can be repeatedly recorded is not suitable for an application in which rewriting is frequently carried out, for example, peripheral devices of the computer system. Further, it is desired that the recording sensitivity be improved in order to reduce the production cost.

SUMMARY OF THE INVENTION

It is a general object of the present invention to provide an optical recording medium in which the above disadvantages are eliminated.

A more specific object of the present invention is to provide an optical recording medium which is highly sensitive at a recording linear velocity as low as 10 m/s or less.

Another object of the present invention is to provide an optical recording medium which is highly sensitive and has improved repetitive recording performance at a relatively low recording linear velocity.

A further object of the present invention is to provide an optical recording medium which has improved optical performance, particularly an improvement in the degree of modulation and reliability of the repetitive reproduction, the optical performance being little degraded while the medium is preserved for a long term.

The above objects of the present invention are achieved by an optical recording medium comprising: a substrate; a first protection layer formed on the substrate; a recording layer formed on the first protection layer; a second protection layer formed on the recording layer; and a reflection heat radiating layer formed on the second protection layer, the recording layer being of a phase-change type in which the recording layer is changed from an amorphous state to a crystal state by a temperature raising and cooling process by projecting a laser beam onto the recording layer, the recording layer having an interface portion interfaced with one of the first and second protection layers, the interface portion having a thermal conductivity lower than that of a remaining portion of the recording layer.

The optical recording medium may be configured so that the recording layer comprises another interface portion interfaced with the other one of the first and second protection layers, the above another interface portion having a thermal conductivity lower than that of the remaining portion of the recording layer.

An optical recording medium comprising: a substrate; a first protection layer formed on the substrate; a recording layer formed on the first protection layer; a second protection layer formed on the recording layer; a reflection heat radiating layer formed on the second protection layer, the recording layer being of a phase-change type in which the recording layer is changed from an amorphous state to a crystal state by a temperature raising and cooling process by projecting a laser beam onto the recording layer, the recording layer containing Ag, In, Sb and Te and at least one additive element which functions to change a thermal conductivity of the recording layer, a density of the at least one additive element being varied in a thickness direction of the recording layer.

The optical recording medium may be configured so that the at least one additive element is nitrogen.

The optical recording medium may be configured so that: the recording layer has an inner portion other than interface portions interfaced with the first and second protection layers; and the density of nitrogen contained in the inner portion is equal to or less than 2 to 10 at.%.

The optical recording medium may be configured so that the at least one additive element is oxygen.

The optical recording medium may be configured so that the recording layer includes at least one additional additive element which is one of Si, Al, Ca and Mg.

The above objects of the present invention are also achieved by an optical recording medium comprising: a substrate; a first protection layer formed on the substrate; a recording layer formed on the first protection layer; a second protection layer formed on the recording layer; and a reflection heat radiating layer formed on the second protection layer, the recording layer being of a phase-change type in which the recording layer is changed from an amorphous state to a crystal state by a temperature raising and cooling process by projecting a laser beam onto the recording layer, the recording layer having a variation in a crystallization temperature in a thickness direction thereof.

The optical recording medium may be configured so that: the recording layer has at least one interface portion interfaced with one of the first and second protection layers; and the at least one interface portion has a crystallization temperature higher than that of a remaining portion of the recording layer.

The optical recording medium may be configured so that: the recording layer includes a phase-change substance containing Ag, In, Sb and Te, and nitrogen which functions to cause a variation in the crystallization temperature; and a density of nitrogen in the recording layer is varied in a thickness direction thereof so that the crystallization temperature is varied in the thickness direction.

The above objects of the present invention are also achieved by an optical recording medium comprising: a substrate; a first protection layer formed on the substrate; a recording layer formed on the first protection layer; a second protection layer formed on the recording layer; and a reflection heat radiating layer formed on the second protection layer, the recording layer being of a phase-change type in which the recording layer is changed from an amorphous state to a crystal state by a temperature raising and cooling process by projecting a laser beam onto the recording layer, a crystallized state of the recording layer being varied in a thickness direction of the recording layer after an initialization.

The optical recording medium may be configured so that the recording layer has an interface portion which is not crystallized as well as a remaining portion of the recording layer.

BRIEF DESCRIPTION OF THE DRAWINGS

Other objects, features and advantages of the present invention will become apparent from the following detailed description when read in conjunction with the accompanying drawings, in which.

DETAILED DESCRIPTION

A description will first be given of an optical recording medium according to a first embodiment of the present invention.

A first formation of the first embodiment of the present invention has a multilayer structure in which a first protection layer, a recording layer, a second protection layer and a reflection heat radiating layer are stacked on a substrate having guide grooves in that order. The substrate is made of an optically transparent member formed of a resin of polycarbonate or the like, or glass, and has grooves for tracking servo. The first and second protection layers are made of a known dielectric member such as ZnS, $SiO_2$, AlN at a given refractive index. The reflection heat radiating layer is made of a metal or a semiconductor such as Al, Au, Ag, Cu, Pd, Pt, Fe, Cr, Ni, Si or Ge. An alloy such as an Al alloy can be used to form the reflection heat radiating layer. A fine amount of an additive element can be contained in the alloy. For example, Ti or N can be added to the Al alloy. The recording layer is formed of a phase-change recording material such as GeTe, GeTeSe, GeTeS, GeSeS, GeSeSb, GeAsSe, InTe, SeTe, SeAs, Ge—Te—(Sn, Au, Pd), GeTeSeSb, GeTeSb, Ag—In—Sb—Te.

The recording layer has a first portion which is interfaced with the first protection layer and a second portion which is interfaced with the second protection layer. Either the first or second portion of the recording layer or both thereof have a thermal conductivity lower than that of the remaining portion of the recording layer. In other words, the thermal conductivity is changed in the thickness direction of the recording layer. This is realized by 1) changing the phase-change recording material or its composition in the thickness direction, 2) forming different formations (bulk and thin film, for example) in the thickness direction by changing the recording layer forming condition, 3) using different dielectric materials in the thickness direction when distributing the recording layer in the dielectric body (granular recording layer), or 4) changing the volume ratio of the recording layer in the thickness direction.

In a second formation of the first embodiment of the present invention, the recording layer is made of Ag—In—Sb—Te and a single or a plurality of additive elements functioning to change the thermal conductivity of the recording layer are added thereto. A plurality of additive elements can be added in composite or solid-solution formation. The density of the additive element or elements is changed in the thickness direction of the recording layer. More particularly, the density of the interface portions of the recording layer is lower than that of the remaining portion thereof. An arbitrary type of the additive element or elements and the density thereof can be selected as long as the optical or phase-change performance of the recording layer is tolerable. The thickness of the recording layer is 8 to 200 nm. The interface portions of the recording layer are at least 1 nm long although the lengths of the interface portions depend on the length of the recording layer.

A third formation of the first embodiment of the present invention is characterized in that nitrogen is used as the additive element in the second formation.

A fourth formation of the first embodiment of the present invention is characterized in that the density of the portion of the recording layer other than the portion interfaced with the first protection layer and the portion interfaced with the second protection layer falls within a range of 2 to 10 at.%.

A fifth formation of the first embodiment of the present invention is characterized in that oxygen is added to the additive element.

A sixth formation of the first embodiment of the present invention is characterized in that Si, Al, Ca or Mg or a combination thereof is added in addition to the additive element of oxygen.

According to the first formation of the first embodiment of the present invention, the interface portions of the recording layer have a low thermal conductivity and can be melted by a low laser power. Hence, the recording sensitivity can be improved. Since the laser power is relatively low, the temperatures of the first and second protection layers are low, and the temperature gradation of the thickness direction of the recording layer can be suppressed. Hence, the thermal shock applied to the protection layers can be relaxed and the repetitive recording performance can be improved. Further, the second protection layer can made thinner, and thus the flake-off at the interface with the second protection layer can be suppressed.

According to the second formation of the first embodiment of the present invention, the additive element or elements are used to change the thermal conductivity along the thickness of the Ag—In—Sb—Te recording layer. Hence it is possible to change the thermal conductivity without a great influence on the optical performance. Although the mechanism in which the thermal conductivity is changed has not completely been analyzed, it is considered that the additive element or elements serve as a bulk member to change the thermal conductivity and function to change the contact area with the protection layer or layers due to a change in the thermal conductivity caused in the interface portion or portions (for example, the thermal conductivity in the field of particles) or a change in the wetting performance. There may be a difficulty that the thermal conductivity of the interface portions can not directly be measured. However, if the performance of the optical disk resulting from the change in the thermal conductivity of the interface portions, such as an improvement in the recording sensitivity, can be recognized by adding the additive element or elements, the above optical disk corresponds to the present invention. It should be noted that wetting performance depends on the materials of the first and second protection layers.

According to the third formation of the first embodiment of the present invention, nitrogen is added to the Ag—In—Sb—Te recording layer. The density of nitrogen in the portions interfaced with the protection layers is higher than the remaining inner portion of the recording layer. In the Ag—In—Sb—Te—N system, scattering of nitrogen in the thickness direction of the recording layer due to the initial crystallization and repetitive recording is not conspicuous, and the effect continues which keeps the thermal conductivity in the interface portions of the recording layer at a low level after a huge number of times that information is repeatedly recorded. Further, an additional advantage can be obtained in which the additive element or elements function to make the crystal particles of the recording layer fine. Hence, it is possible to suppress growth of the crystal particles due to the repetitive recording and a flow of the recording layer as described in Japanese Unexamined Patent Publication Nos. 4-11336, 4-10980, 4-10979, 4-52188 and 4-52188.

According to the fourth formation of the first embodiment of the present invention, the density of nitrogen in the portion of the recording layer other than the interface portion or portions interfaced with the first or/and second protection layer is within the range of 2 to 10 at.%. This composition area functions to suppress crystallization caused by the reproduction light. The interface portions of the recording layer have a density of nitrogen higher than the above range.

According to the fifth formation of the first embodiment of the present invention, oxygen is used as the additive element. The same advantages as those obtained when nitrogen is used can be obtained. Particularly, it is possible to stably preserve the recording medium for a long term.

According to the sixth formation of the first embodiment of the present invention, Si, Al, Ca or Mg or a combination thereof is added in addition to oxygen. Hence it is possible to stabilize the structure of the recording layer with respect to repetitive recording.

A detailed description will now be given of the first embodiment of the present invention.

Figure 1:
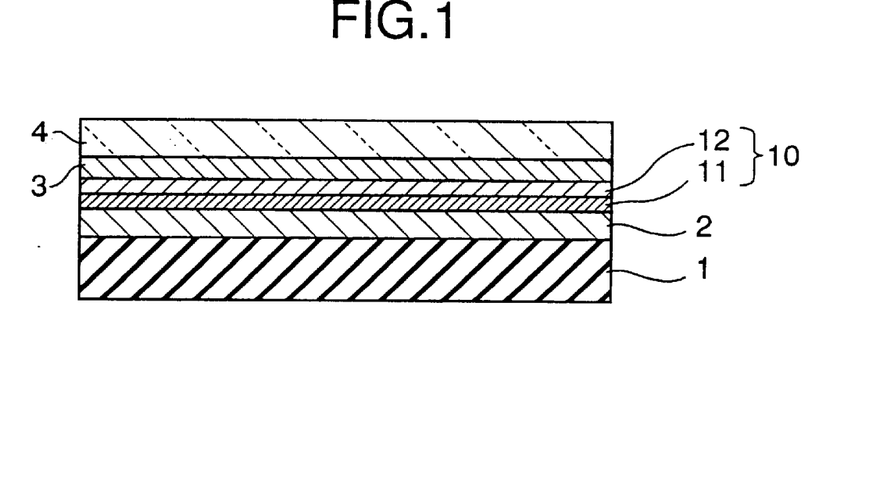
FIG. 1 is a cross-sectional view of an optical recording medium according to a first embodiment of the present invention.

FIG. 1 is a cross-sectional view of an optical recording medium according to the first embodiment of the present invention. A substrate 1 is made of polycarbonate and has grooves (not shown) for tracking servo. A first protection layer 2 is formed on the substrate 1, and is made of ZnS (80 mol %).SiO$_2$ (20 mol %). A lower recording layer 11 is formed on the first protection layer 2 and is made of AgInSbTe (10:5:55:30 at.%). A main recording layer 12 is formed on the lower recording layer 11 and is made of AgInSbTe (10:15:45:30 at.%). The lower recording layer 11 and the main recording layer 12 form a recording layer 10 having a reversible change between the crystal phase and the amorphous phase. A second protection layer 3 made of, for example, AlN, is formed on the main recording layer 12, and a reflection heat radiating layer 4 made of Al—Si is formed on the second protection layer 3. An environment protection layer can be added to the layer 4, as necessary. The lower recording layer 11 is interfaced with the first protection layer 2, and has a thermal conductivity lower than that of the main recording layer 12.

The thicknesses of the layers are as follows. The first protection layer 2 is 30–300 nm thick, and is optimized taking into consideration an optical interference. The thicknesses of the reflection heat radiating layer 4, the second protection layer 3 and the lower recording layer 11 are selected so as to correspond to a given recording linear velocity and obtain an appropriate cooling rate of the main recording layer 12. The thickness of the main recording layer 12 is selected so as to obtain an appropriate degree of modulation. For example, when the recording linear velocity is 2.8 m/s and the recording wavelength is 780 nm, the layers 4, 3, 11 and 12 are respectively 100 nm, 40 nm, 14 nm and 20 nm thick.

Figure 2:
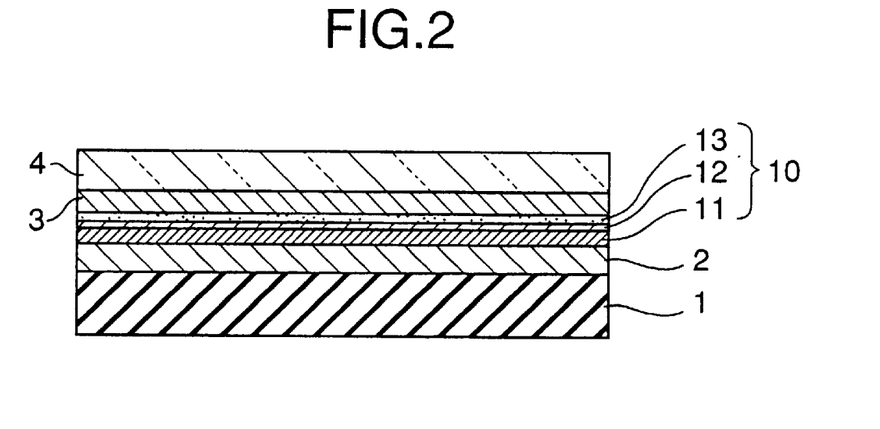
FIG. 2 is a cross-sectional view of another optical recording medium according to the first embodiment of the present invention.
Figure 2A:
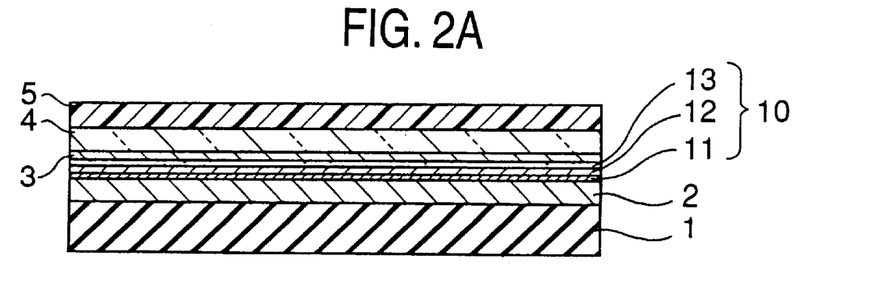
FIG. 2A is a cross-sectional view of a variation of the structure shown in FIG. 2.

FIG. 2 is a cross-sectional view of an optical recording medium having the second formation of the first embodiment of the present invention. In FIG. 2, parts given the same names as those shown in FIG. 1 are given the same reference numbers. The first protection layer 2 formed on the substrate 1 is formed of ZnS (80 mol %).SiO$_2$ (20 mol %). The lower recording layer 11 is formed on the first protection layer 2 and is made of AgInSbTe (15:10:45:30at.%). The main recording layer 12 is formed on the lower recording layer 11 and is made of AgInSbTe (15:10:45:30 at.%). An upper recording layer 13 is formed on the main recording layer 12 and is made of AgInSbTe (15:10:45:30 at.%). The recording layers 11, 12 and 13 form a recording layer as a whole. When Au is added to the recording layer 10 by a few to 30 at.%, the thermal conductivity thereof can be reduced. Further, the second protection layer 3 is formed on the upper recording layer 13, on which the Al—Si reflection heat radiating layer 4 is formed. An environment protection layer 5 can be formed on the layer 4, as necessary, as shown in FIG. 2A.

The thicknesses of the layers shown in FIG. 2 are as follows. The first protection layer 2 is 30–300 nm thick, and is optimized taking into consideration an optical interference. The thicknesses of the reflection heat radiating layer 4, the second protection layer 3, the lower recording layer 11 and the upper recording layer 13 are selected so as to correspond to a given recording linear velocity and obtain an appropriate cooling rate of the main recording layer 12. The thickness of the main recording layer 12 is selected so as to obtain an appropriate degree of modulation. For example, when the recording linear velocity is 2.8 m/s and the recording wavelength is 780 nm, the layers 4, 3, 11, 12 and 13 are respectively 100 nm, 40 nm, 5 nm, 20 nm and 5 nm thick. According to the second formation of the optical recording medium shown in FIG. 2, the thermal conductivity of the main recording layer 12 is appropriately raised so as to be appropriately balanced with the interface portions (layers 11 and 13). Hence, the main recording layer 12 can be as optically good as approximately 20 nm, so that an appropriate cooling rate can be obtained.

Figure 3A:
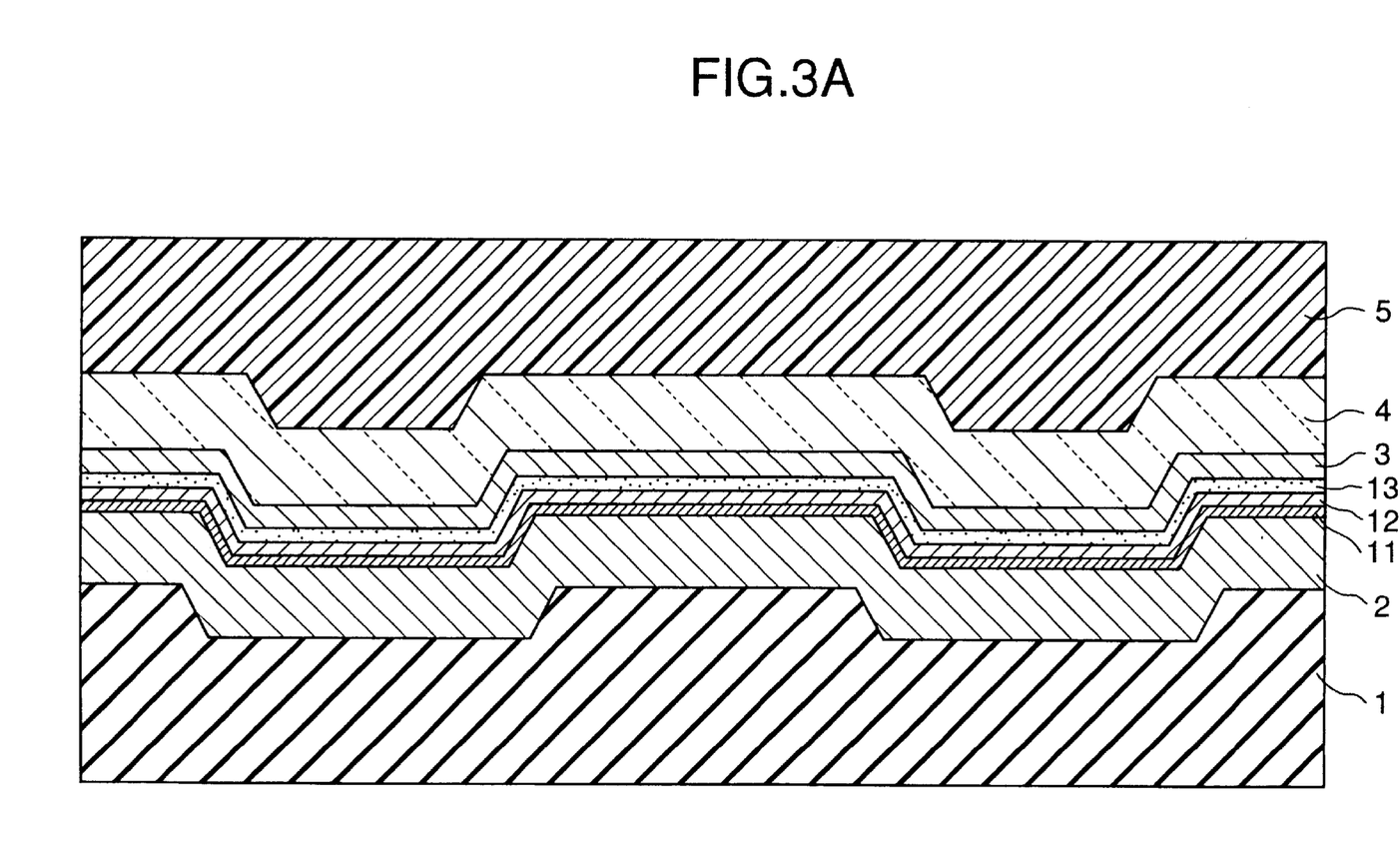
FIGS. 3A, 3B and 3C are respectively cross-sectional views of other optical recording media according to the first embodiment of the present invention.

FIG. 3A is a cross-sectional view of an optical recording medium having the third formation of the first embodiment of the present invention. In FIG. 3A, parts given the same names as those shown in the previously described figures are given the same reference numbers. The first protection layer 2 formed on the substrate 1 corresponding to the CD-RW is formed of ZnS (80 mol %).SiO$_2$ (20 mol %). The lower recording layer 11, the main recording layer 12 and the third recording layer 13 form the recording layer 10. Nitrogen (N) is added to the lower recording layer 11 and the upper recording layer 13. Formed the upper recording layer 13 are the second protection layer 3, the Al—Si reflection heat radiating layer 4 and an environment protection layer 5, stacked in that order. The layers 2, 4, 3, 11, 12 and 13 are respectively, 200 nm, 100 nm, 30 nm, 2 nm, 15 nm and 2 nm thick.

The above layers can be formed by a sputtering process in an Ar gas atmosphere. When growing the lower recording layer 11 and the upper recording layer 13, a nitrogen gas is introduced so that nitrogen is added to the layers 11 and 13. The nitrogen gas is introduced at 4 sccm when growing the layers 11 and 13, and the density of nitrogen in each of the layers 11 and 13 is approximately 10 at.%.

Figure 3B:
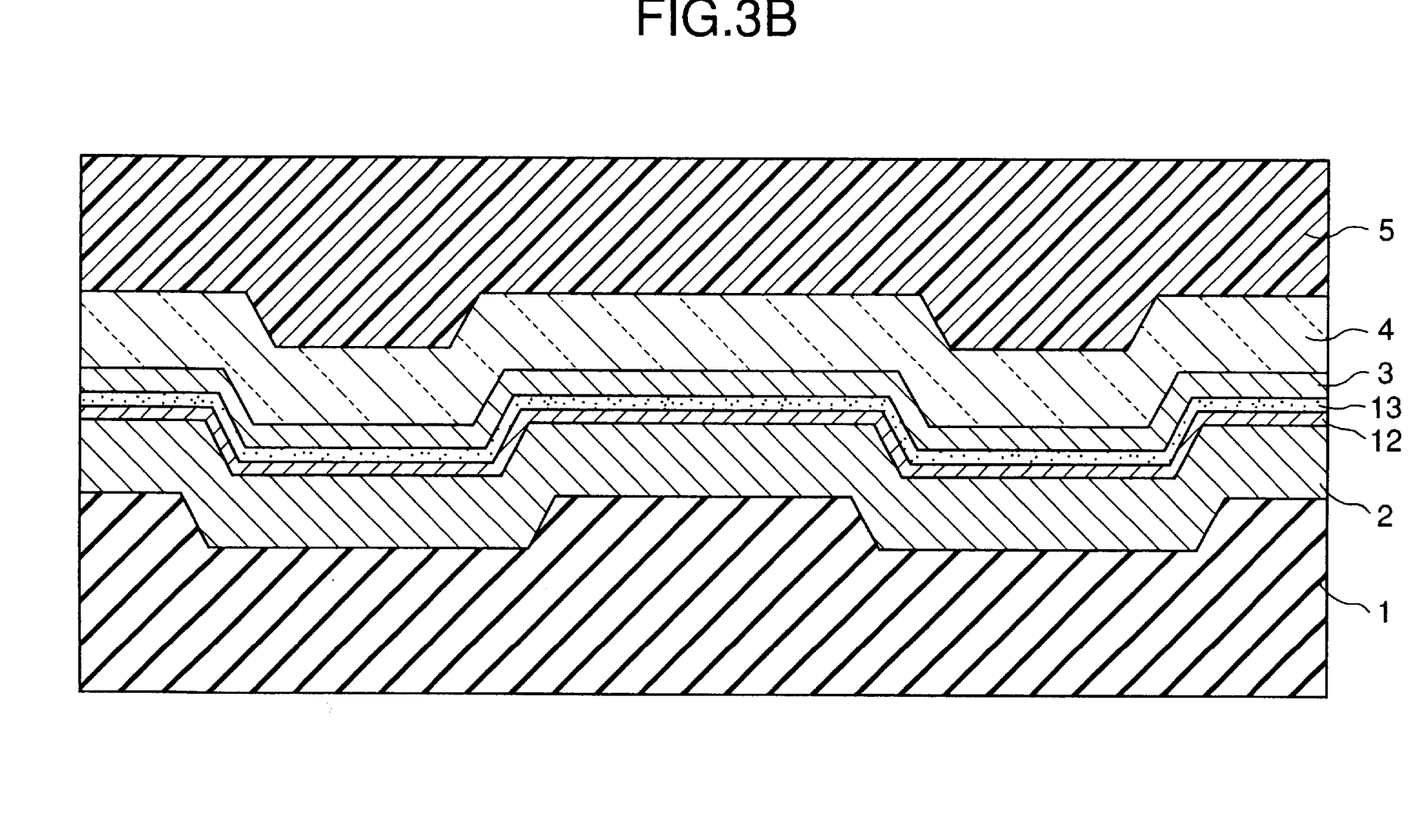
Figure 3C:
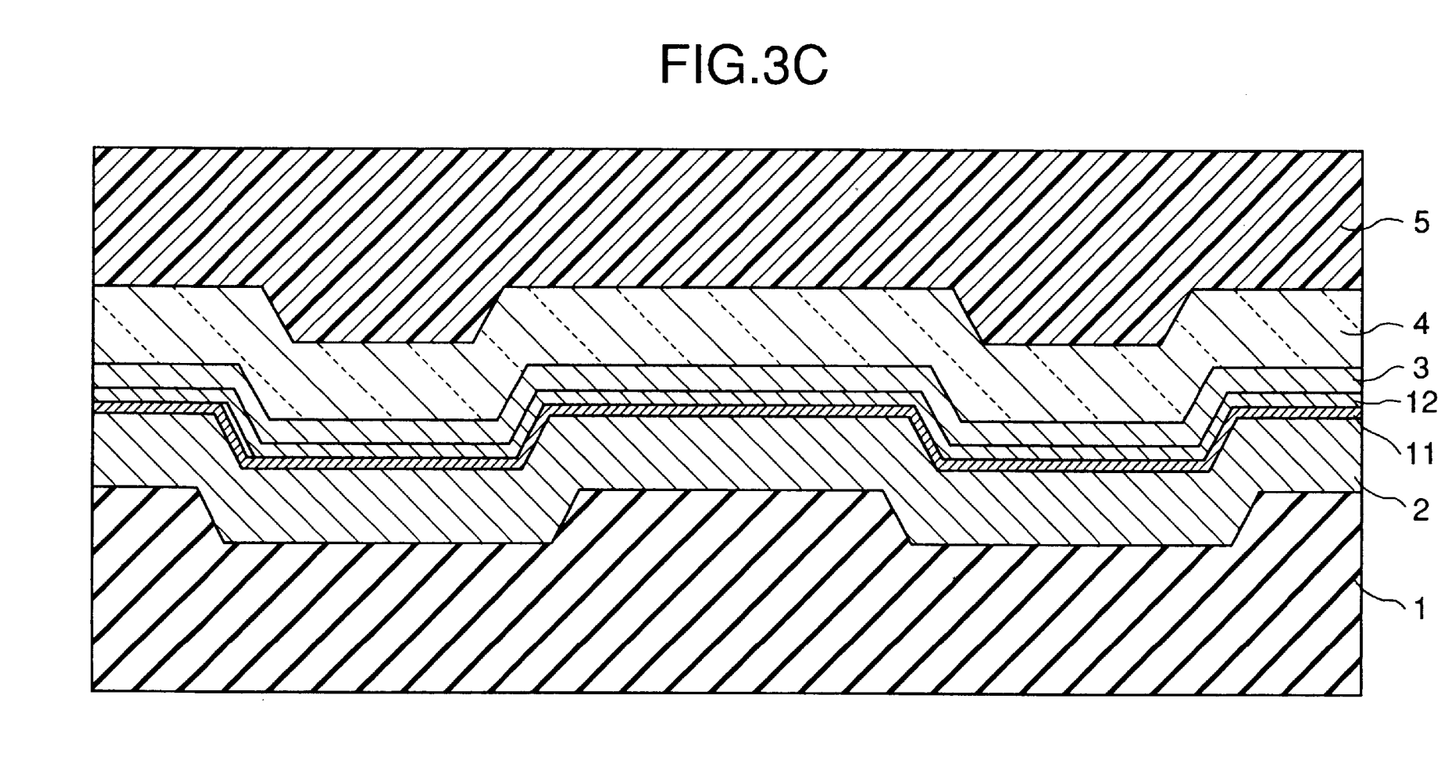

FIGS. 3B and 3C are respectively cross-sectional views of variations of the structure shown in FIG. 3A. The structure shown in FIG. 3B does not have the lower recording layer 11, and the thickness of the main recording layer 12 is changed to a thickness of 17 nm. Thus, the recording layer 10 has only the interface portion (the upper recording layer 13) that is interfaced with the second protection layer 3 and has a density higher than the main recording layer 12. The structure shown in FIG. 3C does not have the upper recording layer 13, and the thickness of the main recording layer is changed to a thickness of 17 nm. Thus, the recording layer 10 has only the interface portion (the lower recording layer 11) that is interfaced with the first protection layer 3 and has a density higher than the main recording layer 12. It should be noted that recess portions in each layer form grooves for tracking servo.

Figure 4A:
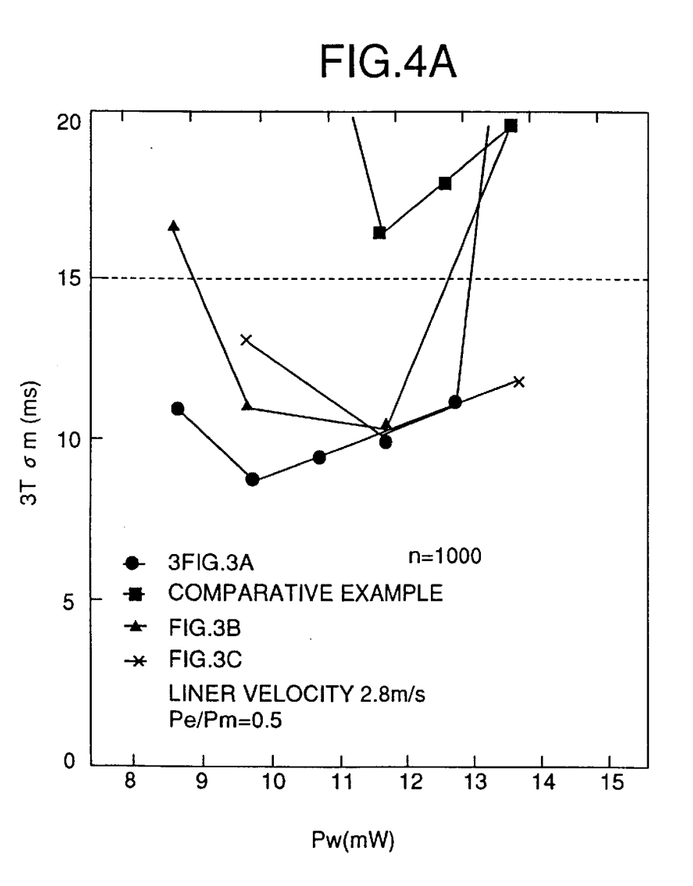
FIGS. 4A and 4B are graphs showing advantages of the optical recording medium shown in FIG. 3C.
Figure 4B:
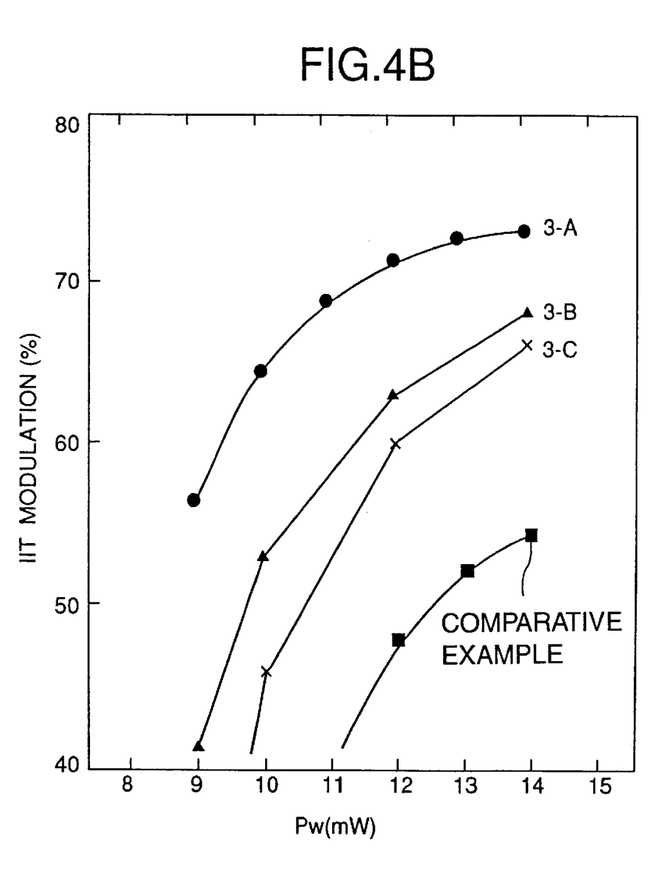

FIG. 4A is a graph of the 3T-jitter performance of the CD-RW optical recording media having the structures shown in FIGS. 3A, 3B and 3C after it is subjected to repetitive recording (the overwrite is carried out 1000 times). FIG. 4B is a graph of the degree-of-modulation (11T modulation) characteristic of the CD-RW optical recording media having the structures shown in FIGS. 3A, 3B and 3C. The recording signal used is an EFM random pattern (8.64 MHz), and the recording/reproducing linear velocity is 2.8 m/s. In FIGS. 4A and 4B, a comparative sample not having the lower and upper recording layers 11 and 13 is shown. Except the above, the comparative sample is produced in the same condition as the structures shown in FIGS. 3A, 3B and 3C. It can be seen from the graph of FIG. 4B that the degree of modulation of each of the structures shown in FIGS. 3A, 3B and 3C obtained at the recording linear velocity 2.8 m/s is greatly improved as compared with the comparative sample which does not have the layers 11 and 13. That is, a reduced recording power can be used to obtain the same degree of modulation as that obtained by the comparative sample (prior art). In other words, the structures shown in FIGS. 3A, 3B and 3C have a sensitivity higher than that of the comparative sample. It can be seen from FIG. 4A that the jitter performances of the structures shown in FIGS. 3A, 3B and 3C are greatly improved, as compared with the jitter performance of the comparative sample. That is, the repetitive recording performance is improved.

When the density of nitrogen added to the lower and/or upper recording layer 11 and/or 13 is equal to or higher than 15 at.%, a conspicuous change in the thermal conductivity of the interface portion (portions) of the recording layer 10 can be obtained. Hence, the cooling profile of the recording layer 10 is improved and the degree of modulation is improved. Further, as an additional effect due to the additive element (s), the crystallization of the interface portion can be suppressed in the normal recording and erasing process. As a result, a damage of the interface portions due to the crystallization/amorphous cycle, and the formation of the interface portions can be stabilized. Hence, a flow and flake off of the recording layer along the interfaces can be suppressed, and the repetitive recording performance is highly improved.

In the third formation of the first embodiment of the present invention, the density of nitrogen can be gradually changed in the thickness direction of the recording layer 10.

Figure 5:
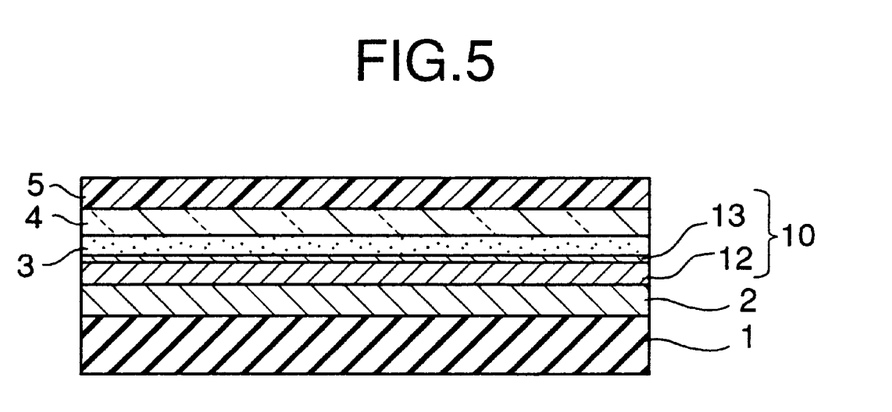
FIG. 5 is a cross-sectional view of yet another optical recording medium according to the first embodiment of the present invention.

FIG. 5 is a cross-sectional view of an optical recording medium having the fourth formation of the first embodiment of the present invention. In FIG. 5, parts given the same names as those shown in the previously described figures are given the same reference numbers. The first protection layer 2 made of ZnS (60 mol %).ZnO (30 mol %).SiO$_2$ (10 mol %) is formed on the polycarbonate substrate 1. The main recording layer 12 and the upper recording layer 13 are stacked on the first protection layer 2 in that order. The density of nitrogen in the main recording layer 12 is lower than that in the upper recording layer 13 but is equal to or greater than 2 at.%. Further, the second protection layer 3 made of AlN, the reflection heat radiating layer 4 made of Al—Ti, and the environment protection layer 5 are stacked in this order. The crystallization of Ag—In—Sb—Te in the portion of the main recording layer 12 having a nitrogen density higher than 2 at.% is suppressed, and a degradation of the recording state caused by projecting the beam at the time of recording can be effectively suppressed. If the density of nitrogen is excessive, it will be difficult to erase (crystallize) information at the time of recording. In view of the initial crystallization, it is preferable that the main recording layer 12 can easily be crystallized. It is also preferable that the density of nitrogen is low in order to improve the productivity of the medium initialization. With the above in mind, the appropriate density of nitrogen falls within the range of 2 at.% to 10 at.%. The addition of nitrogen to the main recording layer 12 produces an appropriate change in the thermal conductivity thereof.

Figure 6:
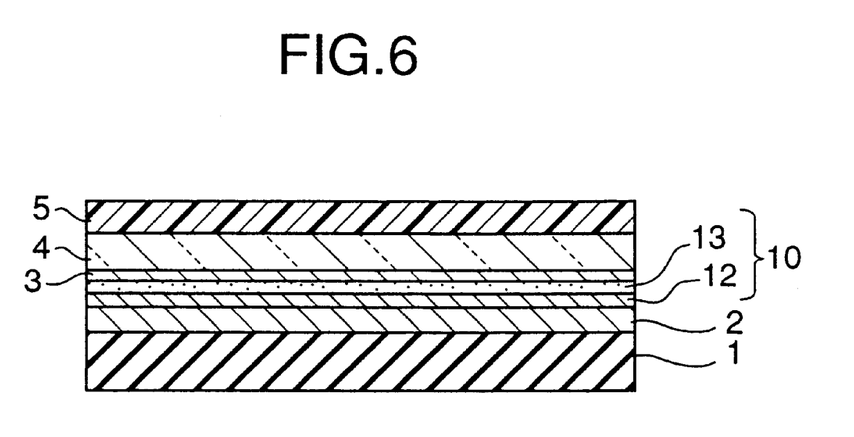
FIG. 6 is a cross-sectional view of a further optical recording medium according to the first embodiment of the present invention.

FIG. 6 is a cross-sectional view of an optical recording medium having the fifth formation of the first embodiment of the present invention. In FIG. 6, parts given the same names as those shown in the previously described figures are given the same reference numbers. The first protection layer 2 made of ZnS (80 mol %).SiO$_2$ (20 mol %) is formed on the polycarbonate substrate 1 having the guide grooves (not shown). The main recording layer 12 and the upper recording layer 13 forming the recording layer 10 are stacked on the first protection layer 2 in that order. Oxygen is added to the main recording layer 12 and the upper recording layer 13. The second protection layer 3 made of AlN, the reflection heat radiating layer 4 made of Al—Ti and the environment protection layer 5 are stacked on the upper recording layer 13 in that order. Due to the effect of oxygen in the upper recording layer 11, the thermal conductivity can be decreased. Although the mechanism of the function of oxygen is not completely understood, the recorded state can be stabilized for a long term due to the function of oxygen. Adding Si, Al, Ca or Mg or a combination thereof functions to stabilize the formation of the recording layer 10 in the thickness direction thereof when the recording is repeatedly carried out.

A description will now be given of an optical recording medium according to a second embodiment of the present invention. The second embodiment of the present invention is characterized in that the crystallization temperature of the recording layer is changed in the thickness direction of the recording layer. The term "crystallization temperature" of the recording layer includes a crystallization temperature at which the initial crystallization occurs and a crystallization temperature at which an amorphous phase formed by rapidly cooling the recording layer after the initial crystallization is completed is changed to the crystal phase. The crystallization temperature of the recording layer can be changed by the composition of the phase-change substance thereof, a variation in the additive element(s) in the thickness direction, or a variation in the formation of the recording layer such as the size of particles in the thickness direction. A change in the crystallization temperature of the recording layer can be realized by stacking recording layers having different crystallization temperatures or employing a structure in which the crystallization temperature is gradually changed in the thickness direction.

According to a first formation of the second embodiment of the present invention, the variation in the crystallization temperature in the thickness direction is made to correspond to a temperature distribution caused when the laser beam is projected onto the recording layer. Hence, the recording layer can be effectively and efficiently crystallized when overwriting. Further, the recording layer is crystallized at different timings in the thickness direction, and large crystal particles can be prevented from being grown. As a result, a mark in which the contour is definite can be formed and the overwrite performance can be improved. When the temperature profile in the thickness direction of the recording layer is taken into account, a portion of the recording layer which reaches the highest temperature is arranged to have a high crystallization temperature. Hence, it is possible to prevent the amorphous phase from being changed to the crystal phase when projecting the reproduction light thereon. When the temperature profile caused by the erasing light and the cooling rate are taken into account, the profile of the crystallization temperature of the recording layer can be arranged to obtain good erasing performance in the direction parallel to the surface of the recording layer.

According to a second formation of the second embodiment of the present invention, the crystallization temperature of the interface portion or portions of the recording layer interfaced with the protection layer or layers is made higher than the remaining portion of the recording layer. In this case, the crystallization of the interface portion or portions of the recording layer after the initialization does not progress as compared with the other portion of the recording layer. Hence, when the recording/erasing operation is repeatedly carried out at a relatively low recording linear velocity, the interface portion or portions of the recording layer are not completely crystallized, as compared with the remaining inner portion thereof. That is, it is difficult for the transition between the crystal phase and the amorphous phase to occur in the interface portion or portions of the recording layer, so that only a relatively small change in the state of the interface portion or portions of the recording layer is caused due to the repetitive recording. Hence, the formation of the interface portion or portions of the recording layer can be stabilized, and the growth of large crystal particles can be suppressed. As a result, the overwrite performance can be improved.

According to a third formation of the second embodiment of the present invention, nitrogen is added to change the crystallization temperature of the recording layer in the thickness direction. In the first embodiment of the present invention, nitrogen is used to change the terminal conductivity of the recording layer. That is, nitrogen functions to change not only the thermal conductivity of the recording layer in the thickness direction but also the crystallization temperature thereof in the thickness direction. Nitrogen can be added to the recording layer by including a nitrogen gas in the gas atmosphere of Ar or the like when forming the recording layer by sputtering or the like. In this process, the density of nitrogen can be changed in the thickness direction of the recording layer by controlling the flow rate of the nitrogen gas or the growth rate. In this case, a single target can be used in the growth process. The Ag—In—Sb—Te recording layer has an increased crystallization temperature with nitrogen added. Hence, it is easy to form the recording layer so that the interface portion or portions thereof have a density of nitrogen higher than that of the remaining inner portion thereof. Hence, the repetitive recording performance at a relatively low recording linear velocity can be improved.

Figure 7:
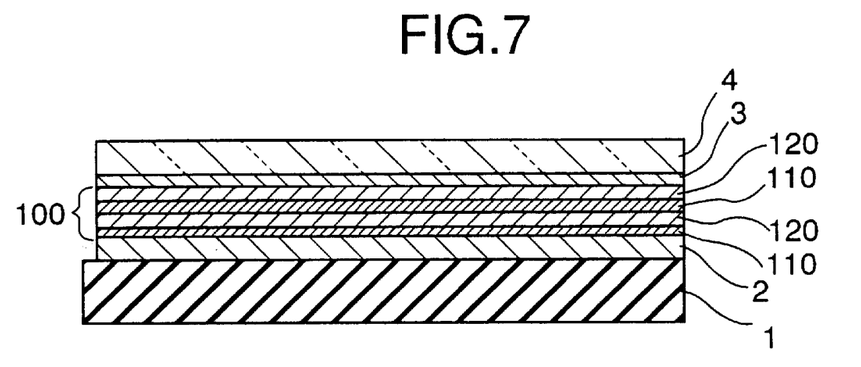
FIG. 7 is a cross-sectional view of an optical recording medium according to a second embodiment of the present invention.

FIG. 7 is a cross-sectional view of an optical recording medium according to the second embodiment of the present invention. In FIG. 7, parts that are the same as those shown in the previously described figures are given the same reference numbers. A recording layer 100 having a multilayer structure is formed on the first protection layer. The recording layer 100 is formed of AgInSbTe. The recording layer 100 is made up of first layers 110 and second layers 120, which are alternately stacked. In the structure shown in FIG. 7, two first layers 110 and two second layers 120 are alternately stacked. The first layers 110 have a crystallization temperature higher than that of the second layers 120. Hence, the different crystallization timings can be obtained in the thickness direction of the recording layer 100. Hence, the growth of crystal particles can be suppressed and the overwrite performance can be improved. The preferable length of the recording layer 100 is 15 to 40 nm when the recording wavelength is equal to 780 nm. The thicknesses of the layers 2, 3 and 4 are optimized taking into the optical performance, the shape of the guide grooves, the thermal characteristic and/or the mechanical characteristic thereof.

It is possible to arrange the recording layer 100 so that the difference in the crystallization temperature between the first layers 110 and the second layers 120 occurs after the recording layer 110 is initialized. In this case, the recording layer 100 is not completely crystallized during the initializing process, but different crystallized states are made available in the thickness direction after the initialization process. This is directed to avoiding the difference between the performance obtained when information is recorded for the first time and the overwrite performance (degree of modulation and jitter) obtained thereafter. The above initialization can be realized by rapidly cooling a portion of the recording layer 100 at a given high cooling rate to change the portion to the amorphous state after the crystallization. Alternatively, the recording layer 100 is partially crystallized at a relatively low initialization temperature at a cooling rate lower than that at which the recording layer 100 is changed to the amorphous state. In the latter method, the initial crystallization is performed so that the incompletely crystallized portion remains. In either method, the different crystallized states corresponding to the difference in the crystallization temperature are formed in the thickness direction of the recording layer 100, and the difference between the performance obtained after the initial write and the overwrite performance obtained on and after the second write can be avoided.

In practice, the environment protection layer can be provided on the reflection heat radiating layer 4.

Figure 8:
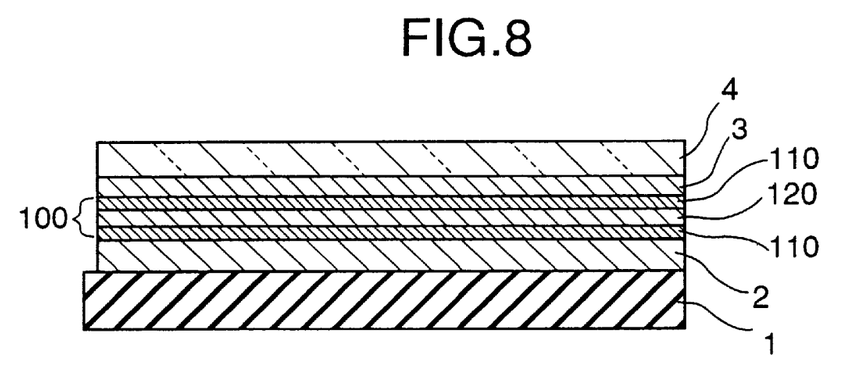
FIG. 8 is a cross-sectional view of another optical recording medium according to the second embodiment of the present invention.

FIG. 8 is a cross-sectional view of another optical recording medium according to the second embodiment of the present invention. In FIG. 8, parts that are the same as those shown in FIG. 7 are given the same reference numbers. The protection layers 2 and 3 are made of ZnS (80 mol %).SiO$_2$ (20 mol %), and the reflection heat radiating 4 is made of Al—Si.

The recording 100 shown in FIG. 8 is made up of the two first layers 110 each made of AgInSbTe (5:10:55:30 at.%), and the second layer 120 made of AgInSbTe (5:5:62:28 at.%). The first layers 110 between which the second layer 120 is sandwiched has a crystallization temperature higher than that of the second layer 120. The above structure of the recording layer 100 is suitable for the recording at the low recording linear velocity.

The thickness of the first protection layer 2 is selected by taking into account an optical interference and is equal to 30 to 300 nm. The thicknesses of the layers 4, 3, 110 and 120 are respectively determined taking into account a given recording linear velocity. Hence, an appropriate cooling rate of the second recording layer 120 can be obtained, and an appropriate degree of modulation can be obtained. For example, when the recording linear velocity is 20.8 m/s and the recording wavelength is equal to 780 nm, the layers 4, 3, the layer 110 adjacent to the layer 2, the layer 120, and the layer 110 adjacent to the layer 3 are respectively 100 nm, 20 nm, 5 nm, 20 nm and 5 nm.

The recording layer 100 is made up of the first layers 110 having a relatively high crystallization temperature and the second layer 120 having a relatively low crystallization layer so that the layers 110 and 120 are alternately stacked. Hence, the different crystallization timings can be obtained in the thickness direction of the recording layer 100. Hence, the growth of crystal particles can be suppressed and the overwrite performance can be improved.

Hence, when the recording/erasing operation is repeatedly carried out at a relatively low recording linear velocity, the first recording layers 110 are not completely crystallized, as compared with the second layer 120. That is, it is difficult for the transition between the crystal phase and the amorphous phase to occur in the first recording layers 110, so that only a relatively small change in the state of the first layers 110 is caused due to the repetitive recording. Hence, the formation of the first layers 110 can be stabilized, and the growth of large crystal particles can be suppressed. As a result, the overwrite performance can be improved.

In practice, the first layers 110 can be made of a substance different from that of the second layer 120.

Figure 9:
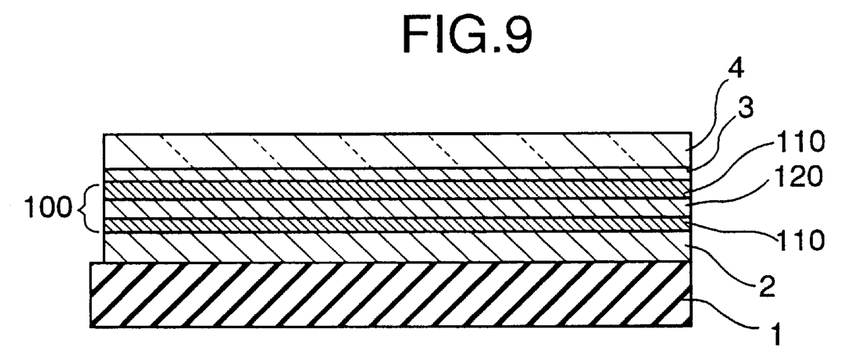
FIG. 9 is a cross-sectional view of yet another optical recording medium according to the second embodiment of the present invention.

A description will be given, with reference to FIG. 9, of yet another optical recording medium according to the second embodiment of the present invention. In FIG. 9, parts that are the same as those shown in FIG. 8 are given the same reference numbers. The recording layer shown in FIG. 9 includes the two first layers 110 and the second layer 120 which is sandwiched between the first layers 110. Nitrogen is added to the first layers 110 and the second layer 120. The density of nitrogen in the first layers 110 is higher than that in the second layer 120, and is optimized so as to obtain a given crystallization temperature. The density of nitrogen in the first layers 110 is approximately 2–20 at.%, and the density of nitrogen in the second layer 120 is approximately 0 to 10 at.%.

Table 1 shows the results of a DSC thermal analysis (a temperature raising rate of 10° C./min) of the initial crystallization for the Ag—In—Sb—Te recording layer with nitrogen added. The density of nitrogen in the recording layer is increased as the flow rate of nitrogen at the time of growing the layer is increased.

TABLE 1

| flow rate of nitrogen | 0 | 0.5 | 1 |
|---|---|---|---|
| crystallization temperature | 156 | 187 | 197 |

The first layers 110 having a relatively high crystallization temperature and the second layer 120 having a relatively low crystallization temperature are alternately stacked. Hence, the different crystallization timings can be obtained in the thickness direction of the recording layer 100. Hence, the growth of crystal particles can be suppressed and the overwrite performance can be improved.

Hence, when the recording/erasing operation is repeatedly carried out at a relatively low recording linear velocity, the first recording layers 110 are not completely crystallized, as compared with the second layer 120. That is, it is difficult for the transition between the crystal phase and the amorphous phase to occur in the first recording layers 110, so that only a relatively small change in the state of the first layers 110 is caused due to the repetitive recording. Hence, the formation of the first layers 110 can be stabilized, and the growth of large crystal particles can be suppressed. As a result, the overwrite performance can be improved.

The above effects can easily be obtained by appropriately selecting the densities of nitrogen in the first and second layers 110 and 120.

Figure 10:
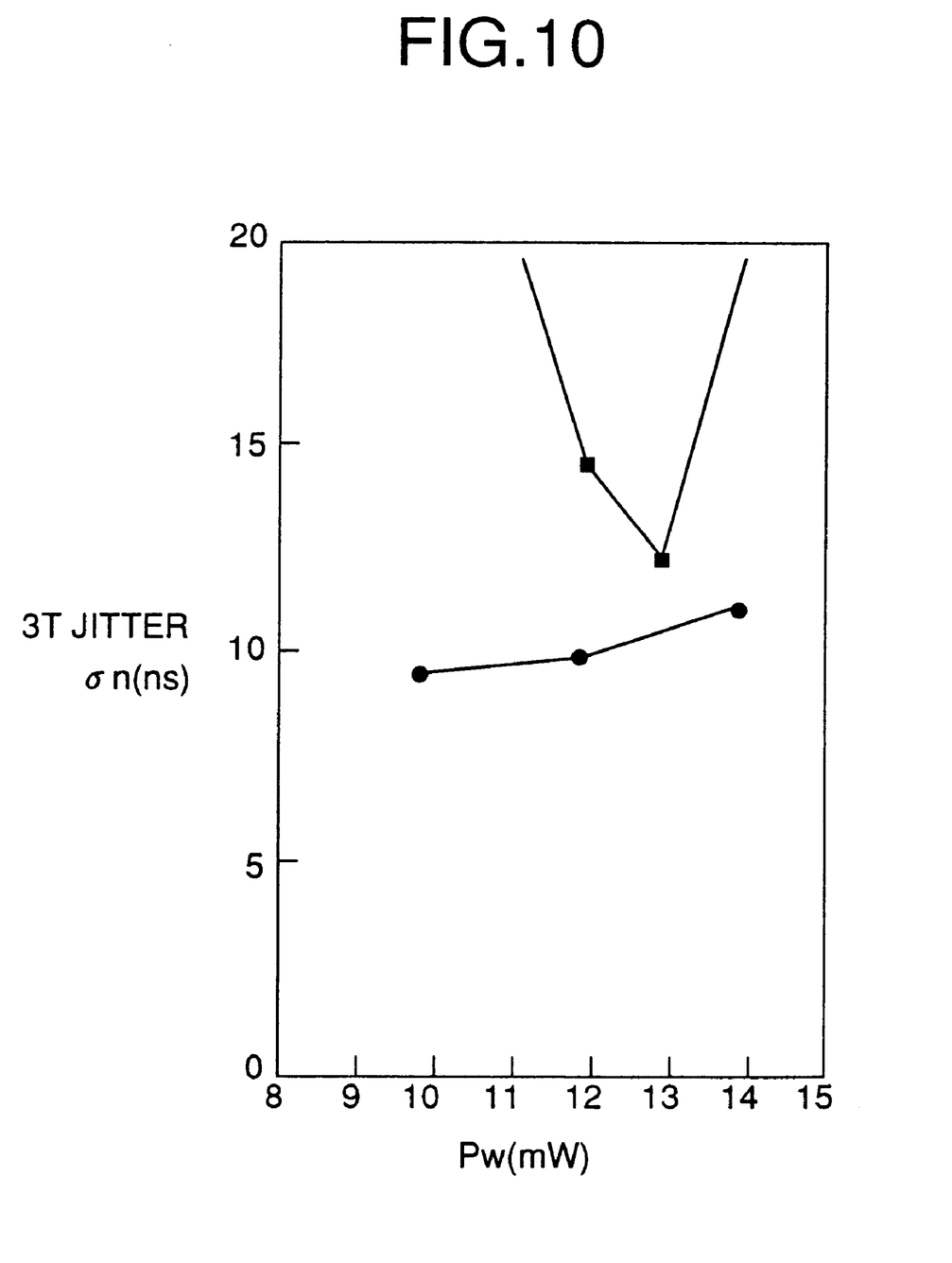
FIG. 10 is a graph showing advantages of the second embodiment of the present invention.

FIG. 10 is a graph of the recording power dependence of the 3T jitter of the optical recording medium shown in FIG. 9 formed in the CD-RW formation after the recording is repeatedly carried out 1000 times. A comparative sample is shown in FIG. 10 which has only the recording 110. The recording signal used is an EFM random pattern (8.64 MHz), and the recording/reproduction linear velocity is 2.4 m/s. The layers 2, 4, 3, the layer 110 adjacent to the layer 3, the layer 120, and the layer 110 adjacent to the layer 2 are respectively 100 nm, 140 nm, 20 nm, 2 nm, 17 nm and 10 nm. It can be seen from FIG. 10 that the structure shown in FIG. 9 has only a little recording power dependence of the 3T jitter, as compared with that on the comparative sample.

Table 2 shows the relationship between the power for initializing the optical recording medium according to the second embodiment of the present invention and the performance thereof (the post-initialization reflection ratio and the jitter value/degree of modulation after the overwrite is carried out 1300 times). The recording power is 12 mW and the recording/reproducing linear velocity is 2.4 m/s.

TABLE 2

| power for initialization | 850 | 900 | 950 |
|---|---|---|---|
| reflection ratio (%) | 18.0 | 18.6 | 19.6 |
| jitter (ns) | 12.0 | 13.5 | 25.1 |

The source for initialization is a semiconductor laser. As the source for initialization is increased, the recording layer is sufficiently heated and initial crystallization is facilitated. As the initial crystallization proceeds, the reflection ratio is increased. If the reflection ratio is excessively increased so that the whole recording layer is completely crystallized, the overwrite performance will be degraded. On the other hand, the recording medium of the present invention has a variation in the crystallization temperature in the thickness direction, and thus the portions of the recording layer having a relatively high crystallization temperature are not completely crystallized.

The present invention is not limited to the specifically disclosed embodiments, and variations and modifications may be made without departing from the scope of the invention.

What is claimed is:

1. An optical recording medium comprising:
   a substrate;
   a first protection layer formed on the substrate;
   a recording layer formed on the first protection layer;
   a second protection layer formed on the recording layer; and
   a reflection heat radiating layer formed on the second protection layer,
   the recording layer being of a phase-change type in which the recording layer is changed from an amorphous state to a crystal state by a temperature raising and cooling process by projecting a laser beam onto the recording layer,
   the recording layer having an interface portion interfaced with one of the first and second protection layers, said interface portion having a thermal conductivity lower than that of a remaining portion of the recording layer.

2. The optical recording medium as claimed in claim 1, wherein the recording layer comprises another interface portion interfaced with the other one of the first and second protection layers, said another interface portion having a thermal conductivity lower than that of the remaining portion of the recording layer.

3. An optical recording medium comprising:
   a substrate;
   a first protection layer formed on the substrate;
   a recording layer formed on the first protection layer;
   a second protection layer formed on the recording layer; and
   a reflection heat radiating layer formed on the second protection layer,
   the recording layer being of a phase-change type in which the recording layer is changed from an amorphous state to a crystal state by a temperature raising and cooling process by projecting a laser beam onto the recording layer,
   the recording layer containing Ag, In, Sb and Te and at least one additive element which functions to change a thermal conductivity of the recording layer,
   a density of said at least one additive element being varied in a thickness direction of the recording layer such that a density of an interface portion interfaced with one of the first and second protection layers is lower than that of a remaining portion of the recording layer.

4. The optical recording medium as claimed in claim 3, wherein said at least one additive element is is nitrogen.

5. The optical recording medium as claimed in claim 4, wherein:
   the recording layer has an inner portion other than interface portions interfaced with the first and second protection layers; and
   the density of nitrogen contained in said inner portion is equal to or less than 2 to 10 at.%.

6. The optical recording medium as claimed in claim 3, wherein said at least one additive element is oxygen.

7. The optical recording medium as claimed in claim 6, wherein the recording layer includes at least one additional additive element which is one of Si, Al, Ca and Mg.

8. An optical recording medium comprising:
   a substrate;
   a first protection layer formed on the substrate;
   a recording layer formed on the first protection layer;
   a second protection layer formed on the recording layer; and
   a reflection heat radiating layer formed on the second protection layer,
   the recording layer being of a phase-change type in which the recording layer is changed from an amorphous state to a crystal state by a temperature raising and cooling process by projecting a laser beam onto the recording layer,
   the recording layer having a variation in a crystallization temperature between different portions of the recording layer in a thickness direction thereof.

9. The optical recording medium as claimed in claim 8, wherein:
   the recording layer h as at least one interface portion interfaced with one of the first and second protection layers; and
   said at least one interface portion has a crystallization temperature higher than that of a remaining portion of the recording layer.

10. The optical recording-medium as claimed in claim 8, wherein:

the recording layer includes a phase-change substance containing Ag, In, Sb and Te, and nitrogen which functions to cause a variation in the crystallization temperature; and a density of nitrogen in the recording layer is varied in a thickness direction thereof so that the crystallization temperature is varied in the thickness direction.

11. An optical recording medium comprising:

a substrate;

a first protection layer formed on the substrate;

a recording layer formed on the first protection layer;

a second protection layer formed on the recording layer; and a reflection heat radiating layer formed on the second protection layer, the recording layer being of a phase-change type in which the recording layer is changed from an amorphous state to a crystal state by a temperature raising and cooling process by projecting a laser beam onto the recording layer, a crystallized state of the recording layer being varied between different portions of the recording layer in a thickness direction of the recording layer after an initialization.

12. The optical recording medium as claimed in claim 11, wherein the recording layer has an interface portion which is not crystallized as well as a remaining portion of the recording layer.

* * * * *